3,083,210
TESTOLOLACTONE DERIVATIVES
Patrick A. Diassi, Westfield, and Samuel C. Pan, Metuchen, N.J., assignors to Olin Mathieson Chemical Corporation, New York, N.Y., a corporation of Virginia
No Drawing. Filed May 11, 1961, Ser. No. 109,282
5 Claims. (Cl. 260—343.2)

This invention relates to, and has for its object, the provision of compounds of the general formula

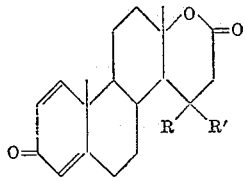

wherein R is hydrogen, R' is α-hydroxy or α-acyloxy, or together R and R' is keto; and of 1,4-bisdehydrotestololactone. These compounds are pharmacologically-active substances, useful as protein-anabolic agents. Hence the new compounds of this invention can be used in lieu of known protein-anabolic steroids, and may be administered either perorally or parenterally in the treatment of post-operative shock and other conditions where tissue degeneration has occurred, being formulated for such administration in the same type of preparations as testosterone, for example, with concentration and/or dosage based on the activity of the particular compound. Unlike testosterone, however, the compounds of this invention have no androgenic activity.

It has further been found that one of the compounds of this invention, namely, 15α-hydroxy-1-dehydrotestololactone (R is hydrogen, R' is α-hydroxy) can be prepared from 1-dehydrotestololactone by subjecting the latter to the action of enzymes of *Penicillium species* A.T.C.C. 11598 (American Type Culture Collection, Washington, D.C.), *Aspergillus giganteus* A.T.C.C. 10059, *Streptomyces aureus* WC 3569 (Waksman Collection, Institute of Microbiology, Rutgers University, New Brunswick, New Jersey) or *Colletotrichum antirrhini*; or to the action of the organism itself under oxidizing and preferably aerobic conditions. It has further been found that this new compound can be esterified to yield the 15α-acyloxy derivative, oxidized to yield the 15-keto derivative, or dehydrated to yield the 14-dehydro derivative.

Among the compounds formed by the process of this invention are 15α-hydroxy-1-dehydrotestololactone, esters of 15α-hydroxy-1-dehydrotestololactone, 15-keto-1-dehydrotestololactone, and 1,14-bisdehydrotestololactone. Although all ester derivatives have the protein-anabolic activity of the free 15α-hydroxy-1-dehydrotestololactone, the preferred esters are those formed from organic carboxylic acids, especially from organic hydrocarbon carboxylic acids having less than ten carbon atoms, as exemplified by the lower alkanoic acids (e.g., acetic, propionic and butyric acid), the monocyclic aromatic carboxylic acids (e.g., benzoic, toluic and xyloic acid), and the monocyclic aralkanoic acids, e.g., phenacetic and α-phenylpropionic acid).

To prepare the compounds of this invention, 1-dehydrotestololactone is subjected to the action of enzymes of one of the above mentioned microorganisms under oxidizing conditions. This oxidation can best be effected by either including 1-dehydrotestololactone in an aerobic culture of the microorganim, or by bringing together, in an aqueous medium, 1-dehydrotestololactone, air, and enzymes of non-proliferating cells of the microorganism.

In general the conditions of culturing the microorganism for the purposes of this invention are (except for the inclusion of the 1-dehydrotestololactone to be converted) the same as those of culturing various other molds for the production of antibiotics and/or vitamin B-12, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch, or dextrin), a fatty acid, a fat and/or the 1-dehydrotestololactone itself. Preferably, however, the medium includes an assimiliable source of carbon and energy in addition to the 1-dehydrotestololactone. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e.g. soybean meal, corn steep liquor, meat extract and/or distillers' solubles) or synthetic (i.e. composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The 1-dehydrotestololactone may be added to the culture during the incubation period, or included in the medium prior to sterilization or inoculation. The preferred (but not limiting) range of concentration of the 1-dehydrotestololactone in the culture is about 0.01 to 0.10%. The culture period (or rather the time of subjecting the 1-dehydrotestololactone to the action of the enzyme) may vary considerably, the range of about 6 to 96 hours being feasible but not limiting.

The process yields, inter alia, 15α-hydroxy-1-dehydrotestololactone, which may be separated from the broth by extraction and crystallization. 15α-hydroxy-1-dehydrotestololactone can, if desired, be esterified, as by treatment with the desired acid, anhydride or acyl halide in an organic solvent (preferably an organic base such as pyridine) to yield 15α-acyloxy-1-dehydrotestololactones; dehydrated, as by treatment with a base (e.g., aluminum tertiary butoxide), to give 1,14-bisdehydrotestololactone; or oxidized, as by treatment with a hexavalent chromium compound (e.g., chromic anhydride), to give 15-keto-1-dehydrotestololactone.

The following examples are illustrative of the invention (all temperatures being in centigrade):

EXAMPLE 1

*15α-Hydroxy-Δ¹-Dehydrotestololactone*

To 50 ml. of a medium consisting of 6 g./l. of corn steep liquor, 2.5 g./l. of yeast extract, 10 g./l. of dextrose, 3 g./l. of ammonium dihydrogen phosphate, 2.5 g./l. of calcium carbonate and 2.2 g./l. of soybean oil contained in a 250 ml. Erlenmeyer flask, a stock culture of Penicillium sp. ATCC 11598 on nutrient agar slants is inoculated. The flasks are incubated at 25° on a rotary shaker run at 280 r.p.m. with a stroke of 2″. After 67 hours the contents of the whole flask are used to inoculate 1 liter of the same medium in a 4 liter Erlenmeyer flask. At the time of inoculation, 1 g. of Δ¹-testololactone dissolved in 15 ml. of dimethylformamide and sterilized by filtration through a Seitz pad is added. The flask is incubated at an inclined position on a reciprocating shaker run at 110 cycles per minute with a stroke of 2″. After 6 days the broth is filtered on a Buchner funnel with the aid of filter cel and the filtrate extracted three times with 350 ml. portions of chloroform. The combined chloroform extracts are washed twice with 500 ml. portions of water and evaporated to dryness, in vacuo. Crystallization of residue from acetone-hexane gives about 440 mg. of 15α-hydroxy-Δ¹-dehydrotestololactone having M.P. about 260–262°; $[\alpha]_D^{24}$ —54.9° (chlf.);

$\lambda_{max.}^{alc.}$ 242 m$\mu$ ($\epsilon$=17,200); $\lambda_{max.}^{Nujol}$ 2.99, 5.83, 6.02, 6.18, 6.26$\mu$.

*Analysis.*—Calcd. for $C_{19}H_{24}O_4$ (316.38): C, 72.12; H, 7.65. Found: C, 72.65; H, 7.42.

15α-hydroxy-1-dehydrotestololactone can be esterified as illustrated in the following example:

EXAMPLE 2

15α-Acetoxy-Δ¹-Dehydrotestololactone

To a solution of 50 mg. of 15α-hydroxy-Δ¹-dehydrotestololactone in 3 ml. of dry pyridine is added 1 ml. of acetic anhydride and the reaction protected from moisture and left overnight at room temperature. After decomposing the excess acetic anhydride with ice water the mixture is distributed between 20 ml. each of chloroform and water. The chloroform is then extracted successively with 2 N HCl, 5% NaHCO₃ and then water and evaporated to dryness, in vacuo. Crystallization of the residue from acetone-hexane gives about 35 mg. of 15α-acetoxy-Δ¹-dehydrotestololactone having M.P. about 188–190°; $[\alpha]_D^{23}$—76.4° (chlf.);

$\lambda_{max.}^{alc.}$ 241 m$\mu$ ($\epsilon$=17,000); $\lambda_{max.}^{Nujol}$ 5.72–5.79, 6.02, 6.18, 6.25$\mu$.

*Analysis.*—Calcd. for $C_{21}H_{26}O_5$ (358.42): C, 70.37; H, 7.31. Found: C, 70.51; H, 7.24.

Similarly, by substituting other acid anhydrides, such as propionic anhydride, or acyl halides, such as benzoyl chloride, for the acetic anhydride in the procedure of Example 2, the corresponding ester derivatives are prepared.

15α-hydroxy-1-dehydrotestololactone can be oxidized as illustrated in the following example:

EXAMPLE 3

15-Keto-Δ¹-Dehydrotestololactone

To a solution of 70 mg. of 15α-hydroxy-Δ¹-dehydrotestololactone in 10 ml. of dioxane, 0.3 ml. of an aqueous solution containing 200 mg./ml. of chromic anhydride and 320 mg./ml. of sulfuric acid is added dropwise over a five minute period. After an additional fifteen minutes a few drops of methanol are added to decompose the excess oxidizing agent and the dioxane is decanted from the precipitated chromic sulfate. The dioxane is diluted with 10 ml. of water and extracted twice with 10 ml. portions of chloroform. The combined chloroform extracts are then washed with water and evaporated to dryness, in vacuo. Crystallization of the residue from acetone-hexane gives about 31 mg. of 15-keto-Δ¹-dehydrotestololactone having M.P. about 230–232°; $[\alpha]_D^{24}$—96.9° (chlf.);

$\lambda_{max.}^{alc.}$ 242 m$\mu$ ($\epsilon$=15,600); $\lambda_{max.}^{Nujol}$ 5.72, 5.81, 6.03, 6.18, 6.24$\mu$

*Analysis.*—Calcd. for $C_{19}H_{22}O_4$ (314.37): C, 72.59; H, 7.05. Found: C, 72.32; H, 7.09.

15α-hydroxy-1-dehydrotestololactone can be dehydrated as illustrated in the following example:

EXAMPLE 4

Δ¹,¹⁴-Bisdehydrotestololactone

A mixture of 125 mg. of aluminum tertiary butoxide in 25 ml. of toluene is distilled until dry (approx. 10 ml. removed) and then 50 mg. of 15α-hydroxy-Δ¹-dehydrotestololactone is added. The mixture is refluxed under nitrogen for two hours then cooled and the toluene extracted successively with 2 N HCl, water, 5% NaHCO₃ and twice again with water and then evaporated to dryness, in vacuo. Crystallization of the residue from acetone-hexane gives about 25 mg. of Δ¹,¹⁴-bisdehydrotestololactone having M.P. about 223–225°; $[\alpha]_D^{23}$+17.4° (chlf.);

$\lambda_{max.}^{alc.}$ 237 m$\mu$ ($\epsilon$=19,000); $\lambda_{max.}^{Nujol}$ 5.78, 6.02, 6.18, 6.24$\mu$

*Analysis.*—Calcd. for $C_{19}H_{22}O_3$ (298.37): C, 76.48; H, 7.43. Found: C, 76.74; H, 7.57.

The invention may be variously otherwise embodied within the scope of the appended claims.

What is claimed is:
1. A compound of the formula

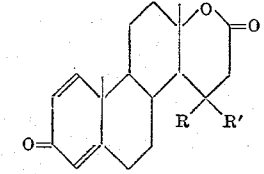

wherein R is hydrogen; R' is selected from the group consisting of α-hydroxy and α-acyloxy, wherein the acyl radical is that of a hydrocarbon carboxylic acid of less than ten carbon atoms selected from the class consisting of lower alkanoic acid, monocyclic aromatic carboxylic acid and monocyclic aralkanoic acid; and together R and R' is oxo.

2. 15α-hydroxy-1-dehydrotestololactone.
3. 15α-hydroxy-1-dehydrotestololactone acetate.
4. 15-keto-1-dehydrotestololactone.
5. 1,14-bisdehydrotestololactone.

References Cited in the file of this patent

UNITED STATES PATENTS

| | | |
|---|---|---|
| 2,837,464 | Nobile | June 3, 1958 |
| 2,946,807 | Fried et al. | July 26, 1960 |

FOREIGN PATENTS

| | | |
|---|---|---|
| 792,803 | Great Britain | Apr. 2, 1958 |

OTHER REFERENCES

Gordon: Chemical Abstracts, volume 52 (1958), page 8355.